United States Patent [19]
Estelle et al.

[11] Patent Number: 5,589,989
[45] Date of Patent: * Dec. 31, 1996

[54] COMPACT OBJECTIVE LENS SYSTEM

[75] Inventors: Lee R. Estelle, Rochester; William T. Goosey, Jr., Fairport, both of N.Y.

[73] Assignee: Eastman Kodak Company, Rochester, N.Y.

[*] Notice: The term of this patent shall not extend beyond the expiration date of Pat. No. 5,572,369.

[21] Appl. No.: 84,387

[22] Filed: Jun. 29, 1993

[51] Int. Cl.⁶ .................................................. G02B 9/14
[52] U.S. Cl. ........................... 359/785; 359/788; 359/790
[58] Field of Search ................................ 359/785, 788, 359/790

[56]  References Cited

U.S. PATENT DOCUMENTS

| | | | |
|---|---|---|---|
| 3,649,103 | 3/1972 | Kamimura | 359/790 |
| 3,784,287 | 1/1974 | Grey | 350/226 |
| 3,895,857 | 7/1975 | Imai | 350/227 |
| 3,910,685 | 10/1975 | DeJager | 350/226 |
| 3,953,112 | 4/1976 | Imai | 350/227 |
| 3,967,884 | 7/1976 | DeJager | 350/226 |
| 4,192,579 | 3/1980 | Hyakumura | 350/227 |
| 4,281,908 | 8/1981 | Yamaguchi | 350/476 |
| 4,415,241 | 11/1983 | Shinohara | 350/476 |
| 4,487,484 | 12/1984 | Mihara | 350/449 |
| 4,606,615 | 8/1986 | Wakamiya | 350/476 |
| 4,620,775 | 11/1986 | Fujioka | 350/449 |
| 4,676,607 | 6/1987 | Wakamiya | 350/476 |
| 4,836,665 | 6/1989 | Wakamiya | 350/476 |
| 4,886,342 | 12/1989 | Kudo et al. | 350/252 |
| 4,892,398 | 1/1990 | Kudo et al. | 350/475 |
| 5,155,632 | 10/1992 | Hirano | 359/790 |
| 5,175,652 | 12/1992 | Shimizu | 359/793 |

FOREIGN PATENT DOCUMENTS 60-177313 9/1985 Japan.
4-153612 5/1992 Japan.

*Primary Examiner*—Georgia Y. Epps
*Assistant Examiner*—Jacqueline M. Steady
*Attorney, Agent, or Firm*—Svetlana Z. Short

[57]  ABSTRACT

A compact objective lens with a diaphragm arranged behind the lens system suitable for use in very compact photographic cameras. The objective lens comprises a plurality of components arranged in a triplet or a triplet type configuration and is capable of covering at least a 55 degree field of view.

34 Claims, 6 Drawing Sheets

COMPACT OBJECTIVE LENS SYSTEM

CROSS-REFERENCE TO RELATED APPLICATION(S)

This application is related to U.S. patent application Ser. No. 08/084,380, filed Jun. 29, 1993, and entitled A TRIPLET-TYPE LENS FOR USE IN A COMPACT PHOTOGRAPHIC CAMERA, filed in the names of Lee R. Estelle and William T. Goosey, Jr.

BACKGROUND OF THE INVENTION

1. Field of the Invention

The present invention relates to a lens system suitable for use as an objective or taking lens for compact photographic cameras and providing a field coverage of at least 55 degrees and preferably 60 degrees or higher.

2. Description of the Prior Art

With the increasing demand for manufacturing smaller, more compact photographic cameras at a lower cost, there is an increased need for use of smaller and less costly lens systems. Triplet or a Tessar-type lens systems are good candidates for such use because these systems have relatively few lens elements.

Triplet-type or triplet derivatives such as Tessar-type lenses have been used in photographic apparatus for many years. Moreover, the objectives having a triplet-type lens system with the diaphragm arranged either in front of the first lens element or behind the last lens element are also well known, and such lens systems are disclosed in U.S. Pat. Nos. 3,910,685, 4,886,342, 4,892,398, 4,676,607, 3,967,884, 3,895,857 and 3,784,287. Such objectives have an advantage of being compact, having relatively few lens elements and eliminating the costs of "split" barrels.

However, many of these lens systems are assembled in their optical barrels with spacers such as spacer rings or shims placed between the optical components. This is disadvantageous because the spacers may cause tolerance build-up on thicknesses as well as tolerance build-ups due to spacer wedge. In addition, there is an increased cost due to extra parts.

The need for the spacers or shims can be eliminated when the elements are made of plastic and mounted as shown in U.S. Pat. Nos. 4,886,342 and 3,784,287, but this severely limits the choice of the optical materials of which the lens elements are made. For example, certain index ranges and V number materials may be required by the photographic lens system, in order to enhance its performance, but such materials are available in optical grade are glass and not in plastic.

Finally, there is a problem if the edge contact is established too far from the clear aperture, the lens element diameter will increase, the lens elements thickness will increase and the compactness of the overall optical system will be compromised.

Thus, there is a growing demand for more compact photographic cameras and correspondingly, there exists a need to further improve and simplify the lens system for use in such cameras, and to lower the cost of making such lens systems by making them less expensive to assemble while maintaining or improving their imaging quality.

SUMMARY OF THE INVENTION

An object of the present invention is to produce a photographic lens device of high quality which includes a lens system which is uniquely suited for use in compact photographic cameras and which is relatively inexpensive to produce and to assemble.

Yet, another object of the present invention is to provide a lens system that is easy to assemble and the configuration of which promotes lens elements to self-center and also eliminates the need of spacers while maintaining the lens system's compactness.

These and other objects of the invention have been attained by a lens system comprising from the object side: a first positive meniscus lens component having foremost lens surface convex to the object side; a second bi-concave lens component; a third bi-convex lens component; and a diaphragm arranged behind the rear-most lens element of the the lens system, wherein the lens system fulfills the following conditions:

$$N_3 - N_1 \leq 0.1$$

$$\frac{N_1}{N_2} \geq 0.9$$

$$0.25f < \Sigma d < 0.35f$$

where f is the composite focal length of the lens system; $\Sigma d$ is the distance from the vertex of the foremost lens surface to the vertex of the last lens surface; $N_1$ represents the refractive index of the positive lens element forming the first lens component; $N_2$ represents the refractive index of the negative lens element forming the second lens component; $N_3$ represents the refractive index of the positive lens element forming the third lens component. These relationships help maintain the aberration's balance while maintaining the compactness of the optical system.

According to another aspect of the present invention, a lens system comprises: a first outer lens component, the first outer lens component being a positive lens component; a negative lens component located between and airspaced from the first outer lens component and a second outer lens component; a positive power second outer lens component; and an aperture stop, said aperture stop located on the outer side of one of said outer lens components, wherein the airspaces between said components are so arranged that there exists an edge contact between the lens components at less than 3 mm and preferably less than 2 mm beyond clear aperture.

According to yet another aspect of the present invention, a compact lens system for use in a compact photographic camera comprises: a plurality of optical elements spaced in a close proximity to one another, the plurality of lens elements having sufficient powers and spacings to enable said lens system to cover a field of view of at least 55 degrees, said plurality of lens elements including at least one positive lens element and one negative lens element wherein the airspace between said positive lens element and said negative lens element is smaller than the thickness of said positive lens element; and the lens system in order to be suitable for use in a compact camera satisfies the following parameters:

$$20 \leq f \leq 30$$

$$5 \leq BF \leq 24.85$$

$$2 \times f/No.|_{min.} \leq 5.6,$$

where f is the focal length of the lens system, BF is the back focus of the lens system. $f/No.|_{min}$ is the f/No. that the system is intended to perform at without being stopped down.

DETAILED DESCRIPTION OF THE PREFERRED EMBODIMENT

Figure 1:
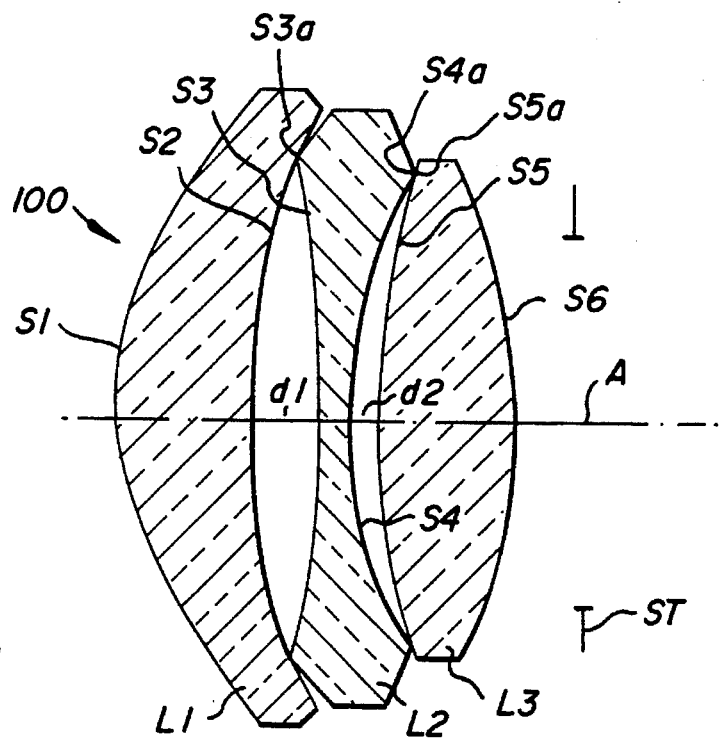
FIG. 1 is a simplified cross-sectional view of a lens system corresponding to a first embodiment of the invention.
Figure 5:
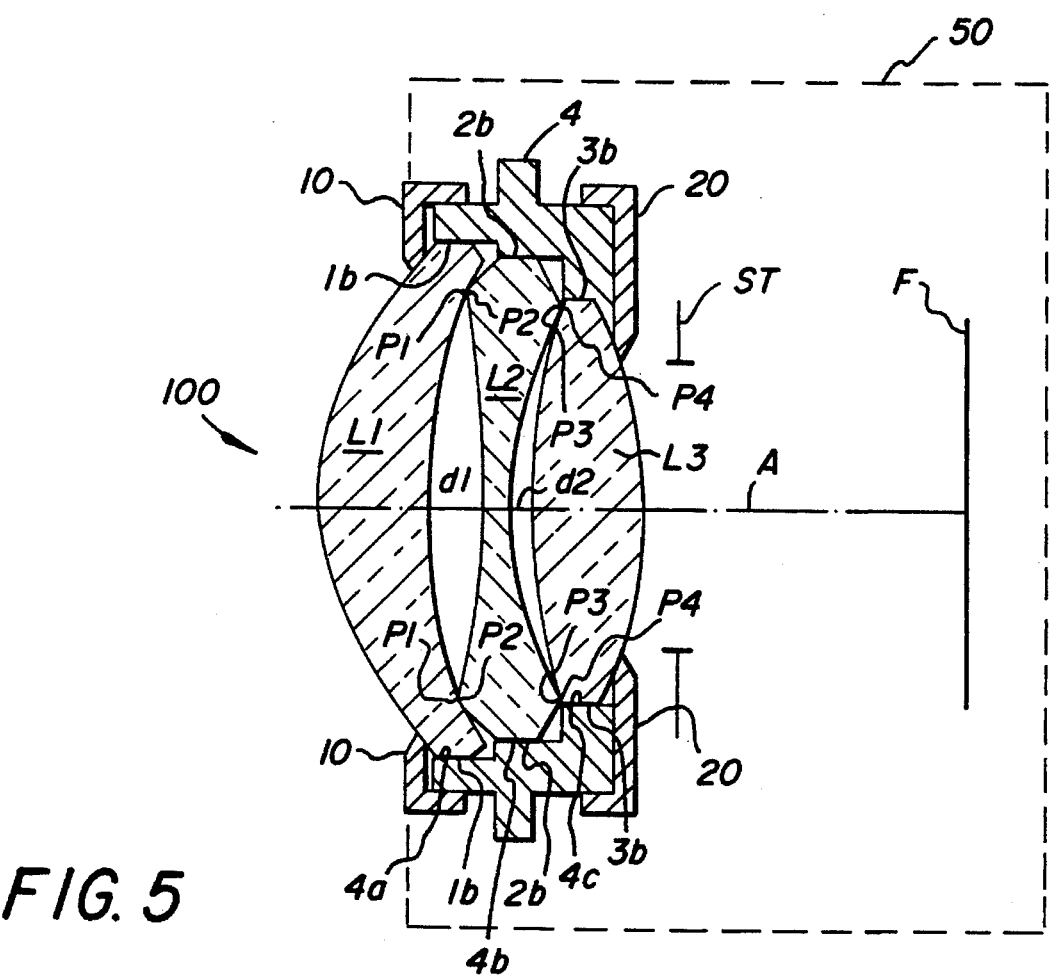
FIGS. 5 and 6 are cross-sectional views in schematic of a photographic device showing the objective lens systems of FIGS. 1 and 2 and their respective mounting structure.

Referring to FIGS. 1 and 5, a photographic device, such as a compact photographic camera 55, includes a barrel 4 and a three-component lens system 100 retained on the lens barrel 4 and including, in order from an object side, a first, second and third lens elements L1, L2 and L3, respectively, in appropriately spaced axial alignment and forming a taking lens system for focusing light onto a photographic film F located by suitable means (not shown) at the focal plane of the camera. An aperture stop ST is located behind the rear lens element L3. The f/No. of the lens system may be determined by the opening in the diaphragm ST. As the opening is reduced, the f/No. increases. The particular lens mount 4 is shown for illustrative purposes only and this is but one type of mount which may be used with the lens system disclosed. Since the lens system is primarily intended for use in connection with very compact photographic cameras which are fabricated on a high volume production basis, it is preferred that the lens mount be compact and also be constructed so that its manufacture is adapted to the assembly of the lens components therein for mass production. In this particular embodiment, the first lens component is positive and is in the form of a single lens element L1 which has a meniscus shape and has a convex first surface S1 and a concave second surface S2. The second lens component is in the form of a bi-concave lens element having a front surface S3 and a rear surface S4. A third lens component is in the form of a bi-convex single lens element and it has a front surface S5 and a rear surface S6. The focal lengths of the first, second and third lens components are 19.86, −8.31 and 10.04 respectively. The absolute value of the ratio of the focal length of the middle component to the total lens system focal length is 0.325. It is important in order to fill the film plane, that the compact lens system according to this invention is capable of covering at least a 55 degree field of view and preferably a field of view of 60 degrees or more and most preferably, a field of 65 degrees or greater. In particular, the lens system of this embodiment is capable of maintaining an excellent performance over a 67 or 68 degree field of view. The lens system satisfies the following conditions and definitions:

$N_3 - N_1 \leq 0.1;$ $\dfrac{N_1}{N_2} \geq 0.9;$ and more preferably $0.9 < N_2/N_1 < 1.0;$ $0.22f < \Sigma d < 0.38f$ where f is the composite focal length of the lens system; $\Sigma d$ is the distance from the vertex of the foremost lens surface to the vertex of the last lens surface; $N_1$ represents the refractive index of a positive lens element forming the first lens component; $N_2$ represents the refractive index of a negative lens element forming the second lens component; and $N_3$ represents the refractive index of a positive lens element forming the third lens component.

The significance of the above-mentioned conditions is as follows: It is advantageous to have high index glasses in the positive lens elements, because it helps to keep the Petzval sum low. Also, with the higher index of refraction, the lens element may be made with weaker radii of curvature, thus, the lens system can be made more compact. In addition, in order to correct the Petzval sum, it is advantageous to have the index $N_2$ of the negative lens element as low as possible. However, typically in flint glasses, the lower the index of refraction is, the higher the V number; and, in order to correct color aberrations, we need a low V number. Thus, the first two requirements help us balance the Petzval sum and color correction in the lens system. The last condition helps to keep the lens compact and is also a condition for well-corrected coma aberration for a wide angle system as ours. The performance of the lens system of the first embodiment is illustrated in FIGS. 3a–3d.

Figures 3A, 3B, 3C, 3D:
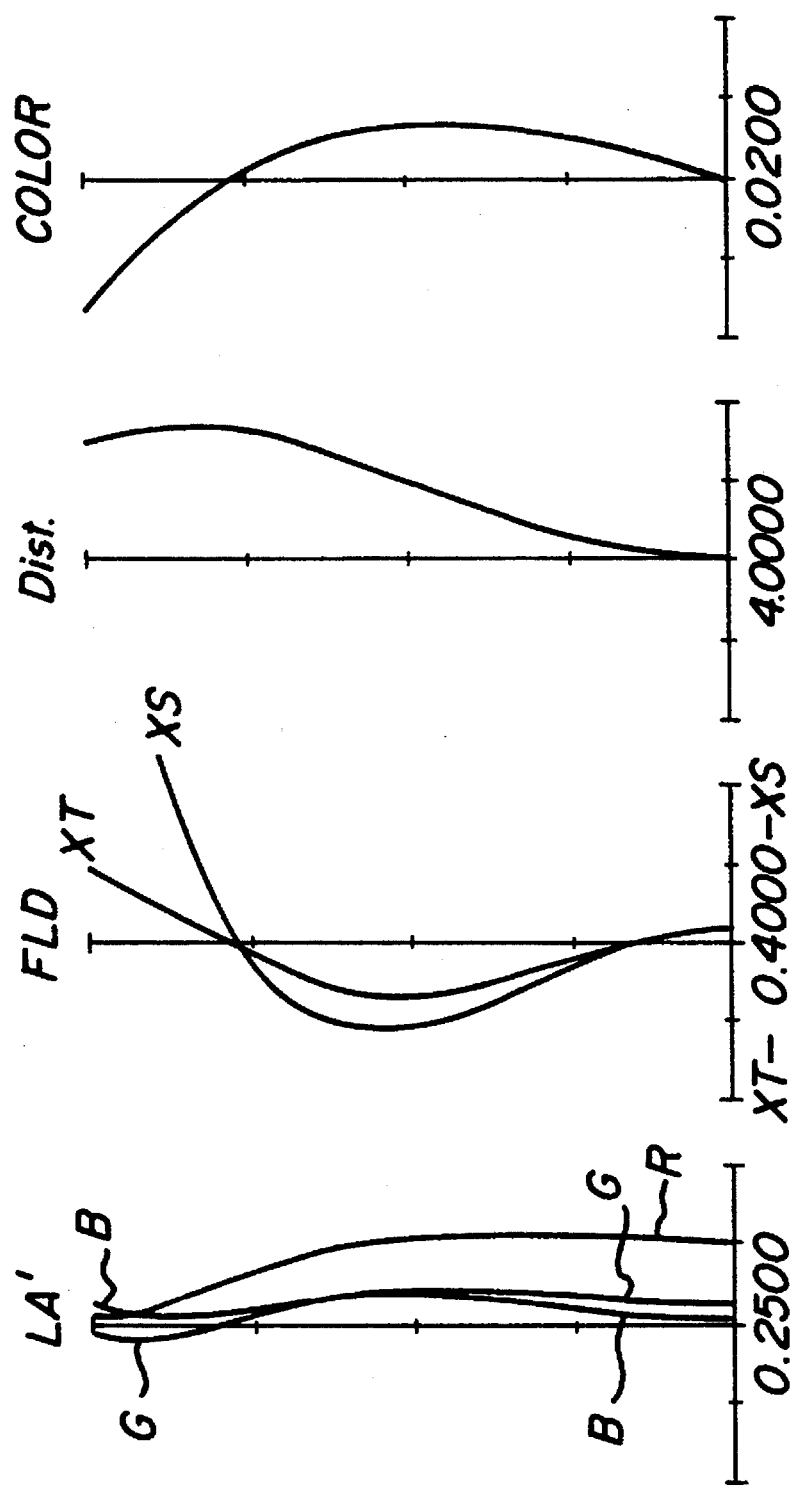
FIGS. 3a–3d represent the aberration curves of the lens system corresponding to the first embodiment.

FIG. 3a is a graph of longitudinal spherical aberration (in mm) with respect to aperture is in three wavelengths. The graph shows well corrected spherical aberration and the axial color which is corrected at approximately the 0.9 aperture.

FIG. 3b is a graph of the tangential and sagittal codding-ton field curvature (in mm). It can be seen that there is a node beyond the 0.6 field and the astigmatism is well balanced.

FIG. 3c is a graph that plots the percent distortion with respect to relative image height. It can be seen that the distortion is not greater than 2% at any point in the field.

FIG. 3d shows a plot of lateral color (in mm) as a function of relative field. It shows that the lateral color is well balanced and does not vary by more than 5 microns through most of the field.

Although in principal the lens elements can be made of plastic, the lens elements of this embodiment are all made from glass. This eliminates some of the distortion problems referred to in U.S. Pat. No. 4,886,342. The lens elements powers, shapes and the airspaces between the lens elements of lens system 100 are arranged so that there exists an edge or other contact between mutually contacting lens elements at less than $\Delta = 3$ mm and preferably at less than $\Delta = 2$ mm beyond the clear aperture CA. (See FIG. 7 for illustration of Δ.) The "clear aperture" of a surface of a lens element in the lens system is basically a minimum size aperture of the lens element that allows all of the desired bundles of light rays to go through the lens system to the image plane. These desired bundles of rays are often determined by other surfaces of the lens system. The clear aperture of a surface of a lens element in the lens system is defined as the necessary minimum size openings on the lens surfaces of the lens system that must satisfy both of the following conditions: a) it must be large enough to satisfy the minimum f/No. required; and b) it must be large enough to transmit the required amount of light in the corners of the field at the maximum field coverage. If the clear apertures are too small, then there will be unacceptable vignetting; and if they are too large, poorly corrected light could reach the image plane. Also, if they are too large, the lens system will not be compact as desired, and may exhibit stray light problems. The section outside the clear aperture may be masked off or otherwise treated so that light striking outside of the clear aperture would be prevented from propagating through the lens system.

The pairs of mutually contacting surfaces are S2a and S3a; S4a and S5a. These surfaces do not have to be flat, vertical surfaces and they do not need to be cemented together. Surfaces S2a, S3a, S4a and S5a are segments of the surfaces S2, S3, S4 and S5, respectively.

Figures 7, 8:
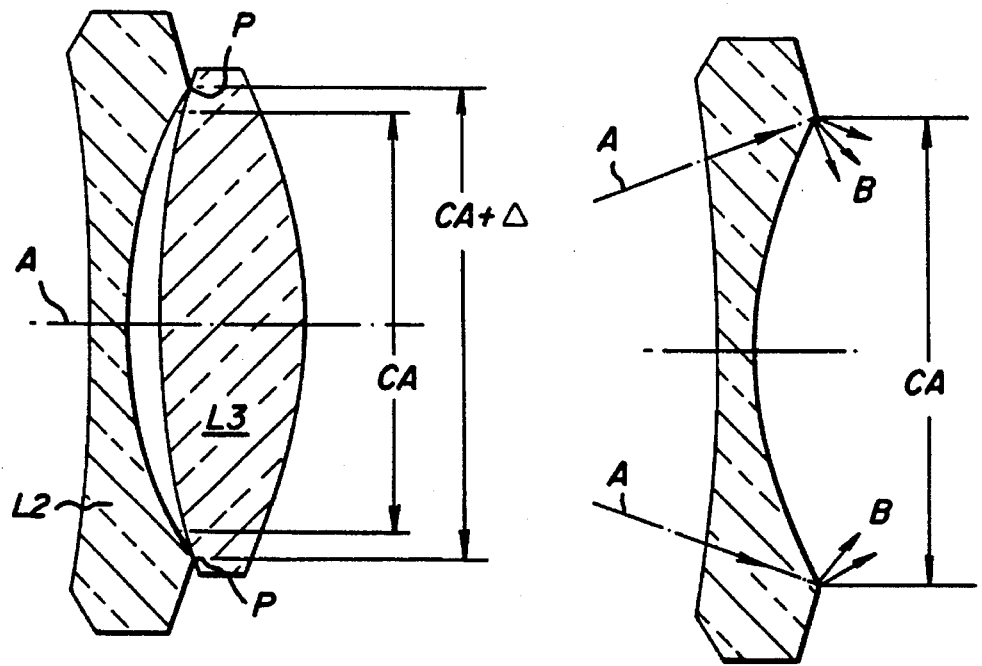
FIG. 7 illustrates the requirements of the edge contact as they apply to the rear surface of a negative lens element.
FIG. 8 illustrates formation and propagation of unwanted light if the edge contact points are located at the clear aperture of the surface.

Having an edge contact allows all of the elements to be placed next to each other so they physically touch each other as in glass-to-glass contact thus eliminating the costly need for superfluous spacers. No adhesive is usually necessary. However, where a thin layer of adhesive is used, this may still be considered to be edge contact in accordance with the invention. This edge contact also eliminates tolerance build-up on the thickness of spacers as well as tolerance build-up on spacer wedge. The manufacturing errors on spacer thickness and spacer wedge angle also cause misalignment of the lens components with respect to each other. This results in the degredation in the performance of the lens system. As stated above, by maintaining the contact between the lens elements, the need for spacers is eliminated which also results in improved performance of the optical system. As an additional benefit of the edge contact, the lens components tend to self align or self center, thus, eliminating a need for complex alignment procedures. The importance of achieving an edge contact at points P on a circle of diameter (CA+Δ), where Δ is in the range of or less than 3 mm, and more preferably 2 mm or less beyond the clear aperture CA (FIG. 7), is that the lens diameter will be held at a minimum. This requirement also tends to minimize the thicknesses of the lens elements and the airspaces between them and thus produces the overall lens system which is very compact and also less expensive to manufacture. On the other hand, it is preferable not to have an edge contact exactly at the clear aperture (i.e. Δ≈0.0 mm beyond the clear apeture) because digs and chips from beveling operation can cause unwanted sparkling. That is, the digs, scratches, bubbles, and chips, etc. at the resulting edge contact cause the impinging light A to disperse (FIG. 8). The (unwanted) dispersed light B then may propagate through the lens system and impinge on the imaging medium such as film. With the stop outside the lens system, the cost of "split" barrels is also eliminated.

The requirement that the airspace $d_1$ between the first and the second elements L1 and L2 be smaller than the first element's thickness $T_1$ and that the airspace $d_2$ between the second lens element L2 and the third lens element L3 be smaller than the thickness $T_3$ of the third lens element L3 facilitates the compactness of the lens system and helps maintain the edge contact between the lens elements. It is preferable that the following relationship be maintained, $T_1 \geq 2d_1$ and $T_3 \geq 2d_2$ and more preferably that $T_1 \geq 2d_1$ and $T_3 \geq 3d_2$. In this first embodiment, $$\frac{T_1}{d_1} = 2.9 \text{ and } \frac{T_3}{d_2} = 3.5.$$

The dimensions $d_1$, $d_2$, $T_1$ and $T_3$ are taken along the optical axis A. In addition, in order to facilitate lens system compactness, one may specify that at least one airspace between the positive lens element and the second or middle lens element be smaller than the thickness of said second lens element. It should be also noted, the requirements that $$0.275 \leq \frac{|f_2|}{f} \leq 0.375$$

and that $$1.5 \leq \frac{f_1}{f_3}$$

(where $f_1$, $f_2$ and $f_3$ are the focal length of the first, second and third lens components respectfully, and f is the focal length of the lens system) help to maintain a nice aberration balance while keeping the lens system compact.

Finally, by placing the aperture stop (or diapragm) at the rear of the lens system, it is protected from dust and dirt. Placement of the aperture stop (i.e. diapragm) in front of the optical system, requires that a cover glass be placed in front of the aperture stop to keep dust and dirt out. Therefore, by placing the aperture stop at the rear of the optical system (i.e. towards the image plane), eliminates the need for the cover glass.

This design is extremely compact as can be determined by a vertex-to-film plane distance which is short—i.e. only 27.26 mm when the focal length is 25.6 mm. The size of the front clear aperture is 9.9 mm and the system f/No. is 4.5. In designing the lens system for the compact camera, it has been determined that the focal length range needs to be between 20 and 30 mm in order to make the lens system more compact and that the focal range should preferably be between 22 and 28 mm and more preferably between 25 and 27 mm. We determined that a short focal length (i.e. f<20 mm) tends to require more elements because the field angle has to increase to cover the same image size, and this causes the aberration correction to become increasingly difficult. In particular, such aberrations as distortion and astigmatism become predominant. On the other hand, a lens system having the same f/No., but a longer focal length (i.e. f>30) will tend to make all elements larger and the front vertex to image plane longer thus producing a more bulky lens. The advantages provided by edge contact would also be jeopardized. In addition, the back focal length BF, (back focal length is the distance as measured from the rear vertex of the rear surface of the last lens element to the image plane) needs to be between 5 mm and 24.85 mm . Placing a lens element closer than approximately 5 mm to the image plane when stopping the lens down to f/16 or greater results in small artifacts on the lens surface near the image plane to be visible at the image plane. Thus, it is found that a lens system satisfying the following parameters or requirements is particularly suited for use in very compact cameras:

$$20 \leq f \leq 30, \tag{1}$$

$$5 \leq BF \leq 24.85 \tag{2}$$

and $$2 \leq f/\text{No.}|_{min.} \leq 5.6, \quad (3)$$

where f is the focal length of the lens system, BF is the back focus of the lens system. f/No.|$_{min}$ is the f/No. that the system is intended to perform at without being stepped down. Alternatively, in the lens system which can be used in lower cost cameras, the f/No. may be slower, thus, the third requirement can be altered to 3<f/No.<16 where f/No. is the lens system's F-number.

FIG. 5 illustrates the lens elements L1, L2 and L3 of lens system 100 are freely placed in the lens barrel 4. Their optical axes are aligned without a need to cement these elements to each other. All of the lens components are pressed against the lens barrel. In this embodiment, the three lens components are mounted in the cylindrical recess surface of the lens barrel and have outer annular barrel contacting surfaces 1b, 2b and 3b respectively which fit within hollow cylindrical surfaces 4a, 4b and 4c forming the inner surfaces of the barrel 4. The lens elements have just enough clearance to move within the barrel so as to be positioned within the barrel. Finally, the lens system 100 is securely retained within the lens barrel 4 by a pressing member 10 for pressing the first lens element L1 against the second lens element L2, and by a pressing member 20 for pressing the third lens element L3 against the second lens element L2.

In the photographic lens devices, the lens components can be readily slipped inside the lens barrel 4. Once the edge contact is established between the lens elements, the lens elements align themselves with a high degree of accuracy and are then retained in the barrel in that alignment by the pressing members 10 and 20 which are adjacent to lens elements 1 and 3 respectively.

Finally, it is preferred that high index materials be used for outer elements in a design of this lens system. Some of the reasons are reduced field curvature and spherical aberration correction. In addition, the edge contact properties are closely related to a best choice of high index glass. (This is all related to f/No., field coverage and focal length range requirements discussed above.) If low indices are used, the powers and radii of the outer elements are redefined in such a way that it becomes more difficult to achieve edge conditions.

Constructional values for the first preferred embodiment of the invention is shown in Table 1 below, in which the lens elements are numbered from front to rear, N is the index of refraction for the d line of the spectrum, V is the Abbe number, R is the radius of curvature of the lens surface, T is the axial thickness of the lens element, and d is the axial separation between the lens elements.

Figure 2:
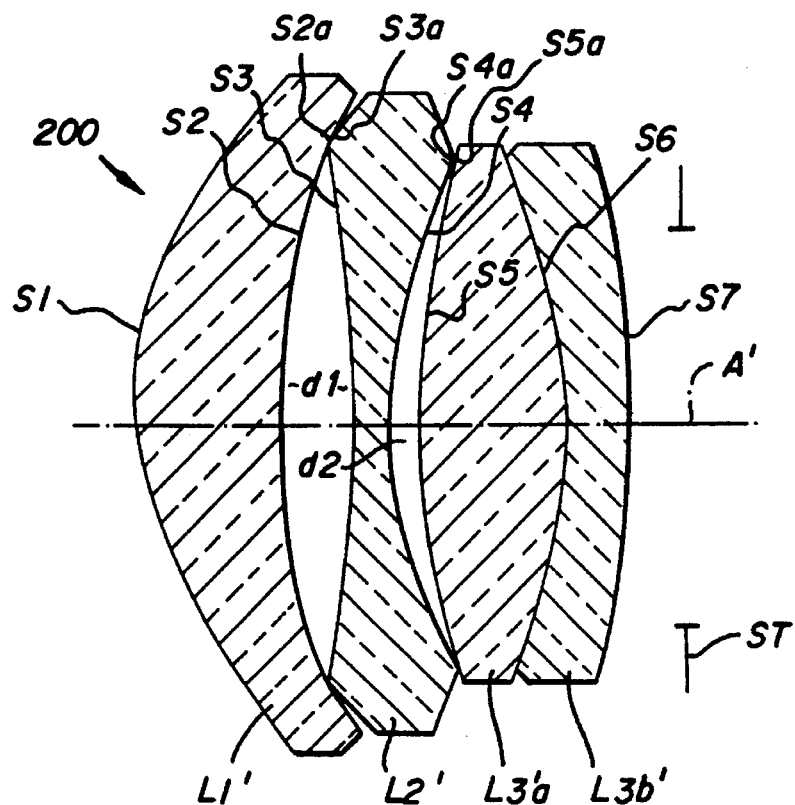
FIG. 2 is a simplified cross-sectional view of a lens system corresponding to a second embodiment of the invention.
Figure 6:
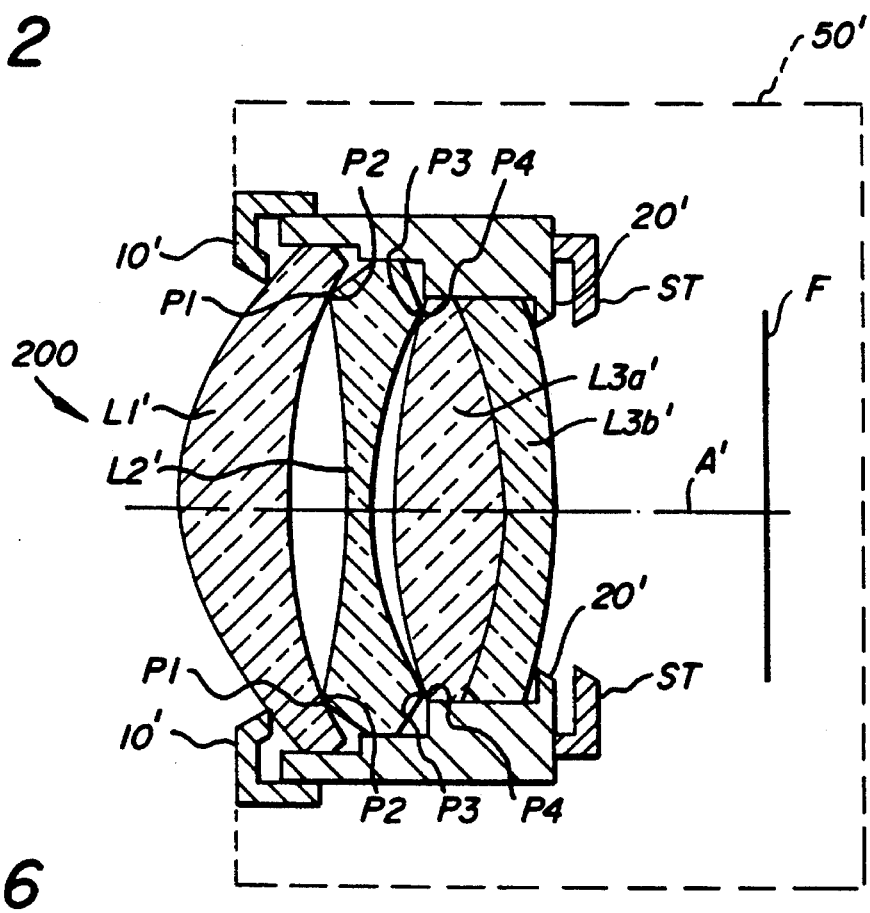
Figure 11:
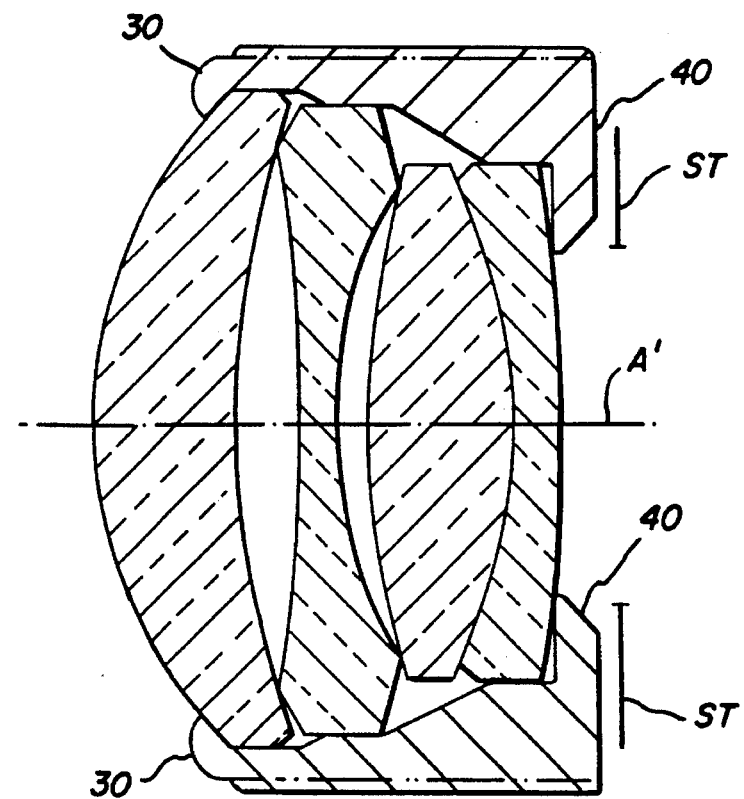
FIG. 11 is a cross-sectional view of the lens system of FIG. 2 and showing a mounted objective lens system in a barrel utilizing a heat-seal ring retainer.

The second embodiment of the present invention is shown in FIGS. 2, 6 and 11. Referring to FIGS. 2, 6 and 11, a photographic device includes a barrel (4A, 4B) and a three component lens system 200 retained on the lens barrel. The lens system 200 parameters are provided in Table 2.

The second embodiment is similar to the first embodiment in that it is also a behind-stop type lens system for photographic cameras and in that it also comprises three lens components (arranged in positive-negative-positive configuration). Thus, this lens constitutes a triplet derivative. However, unlike the first embodiment, this embodiment comprises four lens elements. They are, in succession from the object side, a first lens component that is in the form of a first lens element L1' which is a positive meniscus lens element having its convex surface facing the object side, a second lens component that is in the form of a second lens element L2' which is biconcave, a third lens component that is in the form of a third lens element L3a' which is biconvex and a fourth lens element L3b' which is a negative meniscus lens element having its convex surface facing the image side. The third and the fourth lens elements L3a' and L3b' are joined together to form a positive cemented doublet lens component. The lens system 200 has a stop ST in position most adjacent to the rear surface S7' of the fourth or rear-most lens element L3b'. It is important that the lens system has a field of view of at least 55 degrees, preferably over 60 degrees and most preferably 65 or more degrees. Accordingly, the lens system of this embodiment has a full field of over 67 degrees. The lens system 200 was found, as in the previous embodiment, that having $$0.275 \leq \frac{|f_2|}{f} \leq 0.375 \text{ and } 1.5 \leq \frac{f_1}{f_3}$$

helped maintain the aberration balance while keeping the lens system compact. The lens system of the second embodiment also satisfies the following conditions:

$$20 \leq f \leq 30$$

$$5 \leq BF \leq 24.85$$

$$3 \leq f/\text{No.} \leq 16,$$

more specifically, the parameters of the lens system are provided in the following table.

TABLE 1

$f = 25.57$; BF = 20.68; semifield angle = 33.58°.
Maximum aperture with no vignetting corresponds to $f/4.5$.

| Lens Element | Surface | Clear Aper. | Radius | Thickness | Material $N_d$ | V |
|---|---|---|---|---|---|---|
| L1 | S1 | 9.90 | $R_1 = 7.4251$ | $T_1 = 2.852$ | 1.713 | 53.8 |
|    | S2 | 7.90 | $R_2 = 13.046$ | $d_1 = 0.974$ |  |  |
| L2 | S3 | 7.90 | $R_3 = -21.793$ | $T_2 = 0.520$ | 1.699 | 30.1 |
|    | S4 | 6.86 | $R_4 = 8.0817$ | $d_2 = 0.533$ |  |  |
| L3 | S5 | 6.79 | $R_5 = 15.453$ | $T_3 = 1.862$ | 1.786 | 44.2 |
|    | S6 | 6.28 | $R_6 = -15.453$ | $d_3 = 1.000$ |  |  |
|    |    | 4.40 | DIAPHRAGM |  |  |  |

TABLE 2

$f' = 25.56$; BF = 20.31; semifield angle = 33.58°; f/No. = 3.5.

| Lens Element | Surface | Clear Aper. | Radius | Thickness | Material $N_d$ | V |
|---|---|---|---|---|---|---|
| L1' | S1' | 10.53 | $R_1 = 8.02940$ | $T_1 = 2.500$ | 1.734 | 51.8 |
|  | S2' | 8.80 | $R_2 = 15.8029$ | $d_1 = 1.102$ |  |  |
| L2' | S3' | 8.23 | $R_3 = -31.7598$ | $T_2 = 0.668$ | 1.689 | 31.2 |
|  | S4' | 6.76 | $R_4 = 8.18380$ | $d_2 = 0.577$ |  |  |
| L3a' | S5' | 6.60 | $R_5 = 15.8680$ | $T_3 = 2.565$ | 1.788 | 47.5 |
| L3b' | S6' | 6.11 | $R_6 = -9.92860$ | $T_4 = 0.850$ | 1.569 | 56.1 |
|  | S7' | 5.91 | $R_7 = -31.4600$ | $d_3 = 1.000$ |  |  |
|  |  | 6.14[1] | DIAPHRAGM[1] |  |  |  |

[1] THE DIAPHRAM ACTS AS A BAFFLE WHEN THE LENS OPERATES AT f/3.5 AND APERTURE HOLD ON SURFACE S7' BECOMES THE STOP.

All of the above dimentions, for radii, thickness and clear apertures are in millimeters.

The performance of this lens system 200 is illustrated in FIGS. 4a–4d.

Figures 4A, 4B, 4C, 4D:
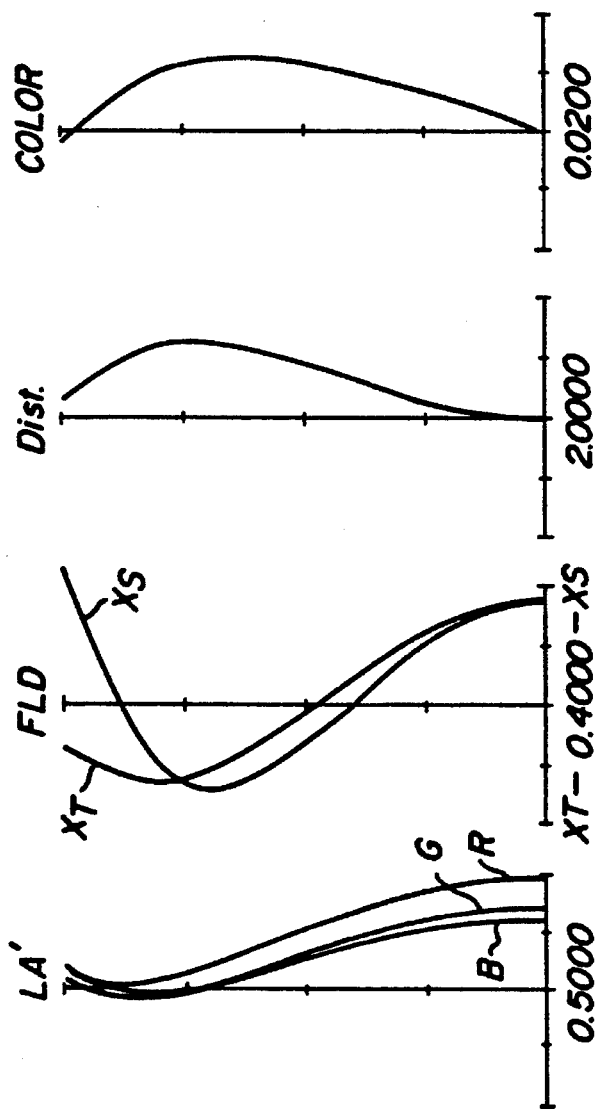
FIGS. 4a–4d represent the aberration curves of the lens system corresponding to the second embodiment.

FIG. 4a is the graph of longitudinal spherical aberration (in mm) with respect to aperture in three wavelengths. The graph shows well corrected spherical aberration and the axial color is corrected at approximately the 0.9 aperture.

FIG. 4b is a graph of the tangential and sagittal coddington field curvature (in mm). It can be seen that there is a node beyond the 0.6 field and the astigmatism is well balanced.

FIG. 4c is a graph that plots the percent distortion with respect to relative image height. The distortion is less than approximately 0.5% at any point in the field.

FIG. 4d shows a plot of lateral color (in mm) as a function of relative field. It shows that the lateral color is well balanced and does not vary by more than 5 microns through most of the field.

FIGS. 6 and 11 illustrate that the lens elements L1, L2, L3 and L4 of lens system 200 are freely placed in the camera's lens barrels. Their optical axes A' are aligned without a need to cement these elements to each other. All of the lens components are pressed against the respective lens barrel inner walls. In each embodiment, the three lens components are mounted in cylindrical recess surfaces of the lens barrel and have outer annual barrel contacting surfaces 1b', 2b' and 3b' respectively. The lens elements have just enough clearance to move within the barrel so as to be positioned within the barrel. Finally, the lens system 200 is securely retained within the lens barrel by a pressing member 10 for pressing the first lens element L1 against the second lens element L2, and by a pressing member 20 for pressing the third lens element L3 against the second lens element L2.

In the photographic lens devices, the lens components can be readily slipped inside the lens barrel 4. Once the edge contact is established between the lens elements, the lens elements align themselves, i.e. self-center, with a high degree of accuracy and are then retained in the barrel in that alignment by pressure means such as the pressing members 10' and 20' or the barrel surfaces 30 and 40 which are adjacent to lens elements L1 and L4 respectively.

Finally, it is preferred that high index materials be used for outer elements in a design of this lens system. Some of the masons are reduced field curvature and spherical aberration correction. In addition, the edge contact properties are closely related to a best choice of high index glass. (This is all related to f/No., field coverage and focal length range requirements discussed above.) If low indices are used, the powers and radii of the outer elements are redefined in such a way that it becomes more difficult to achieve edge conditions.

Figure 12B:
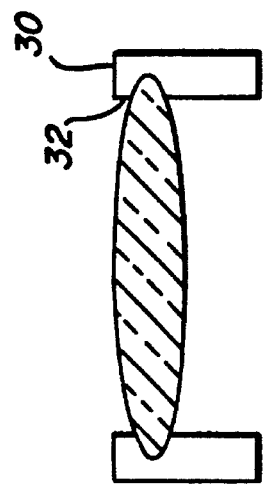
FIGS. 12a and 12b illustrate steps in the formation of a heat-seal retainer for an optical mount such as one illustrated in FIG. 11.
Figure 12A:
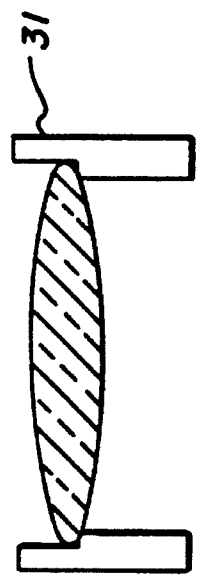

The lens system assembly is done in the following fashion. At first, the rear component is dropped into the lens barrel where it is retained by front and rear pressing members 20 or 40 and the barrel walls. The second component is dropped in second. It contacts physically with the rear lens component establishing the edge contact. Once the edge contact is established, the airspace $d_2$ between the second and the rear lens component is automatically set with the required precision without any further involvement on the part of the assembly personnel. Lastly, the front component corresponding to the lens element L1 is dropped into the lens barrel. Once the edge contact between the front component and the second component is established, the distance between these components is accurately set. Finally, with all lens components nested against each other in a barrel, pressure means is applied to the front lens element to permanently keep the lens system elements in an optical, axially aligned relationship with each other and to prevent lens elements from movement. This may be done by use of a pressure member 10' (FIG. 6), or alternatively by use of a heat seal retainer 30 (FIG. 11). The heat seal retainer 30 may be formed (FIG. 12) by applying sufficient sonic energy to create heat which softens a plastic lip 31 which forms a ring 32 and extends round the edge of a lens element. A metal tool then presses the ring over and down upon the upper surface of the lens element, permanently retaining it in the barrel.

As in the previous embodiment, the airspaces between the lens elements are arranged so that there exists an edge contact between the lens elements at Δ equal to about 2 mm, or Δ less than 2 mm beyond the clear aperture CA. This insures that the lens elements can be placed next to each other in glass-to-glass (i.e. lens element-to-lens element) contact thus eliminating the costly need for superfluous spacers while having a compact lens system which can be used in a compact photographic camera. With the stop outside the lens system and this combination of lens elements, the cost of "split" barrels is eliminated. When two lens elements are to be edge contacted to eliminate the need for a spacer, it is advantageous to have both lens elements have a finished diameter that extends beyond the edge contact points and then precision bevel one of the elements (usually the element with the concave surface). The bevel is placed at the precise distance from the lens element's center so that its sag, when edge contacted with another lens element (as done during the assembly of lens elements into the barrel), will accurately define the desired airspace between the two elements. In addition, manufacturing the precision bevel in this manner reduces the amount of edge chips and hence reduces the effects of unwanted stray light.

The requirement that the airspace d1 between the first and the second lens elements L1' and L2' be smaller than the first lens element's thickness $T_1$ and that the airspace $d_2$ between the second lens element L2 and the third lens element L3a' be smaller than the thickness $T_3$ of the third lens element L3a' facilitates the compactness of the lens system and helps maintain the edge contact between the lens elements. It is preferable that the following relationship be maintained, $T_1 \leq 2d_1$ and $T_3 \leq 2d_2$ and more preferably that $T_1 \leq 2d_1$ and $T_3 > 3d_2$. In this first embodiment, $$\frac{T_1}{d_1} = 2.2 \text{ and } \frac{T_3}{d_2} = 4.4.$$

In addition, in order to facilitate lens system compactness, one may specify that at least one airspace between the positive lens element and the second or middle lens element be smaller than the thickness of said second lens element.

This arrangement also enhances the unique method of utilizing the rear surface of which lens of the lens system to act as the stop when the lens system is operating in a wide open or fast mode (i.e. low f/No.) and enabling the "true" diaphragm; i.e. the aperture stop, to act as a baffle to control the upper rays at the f/3.5 opening (see FIG. 6). For f/Nos. slower than f/3.5, the diaphragm acts as the true stop.

Furthermore, by placing a limiting clear aperture at surface S5 controls upper rays at the mid obliquities thus improving their image quality.

Figure 9:
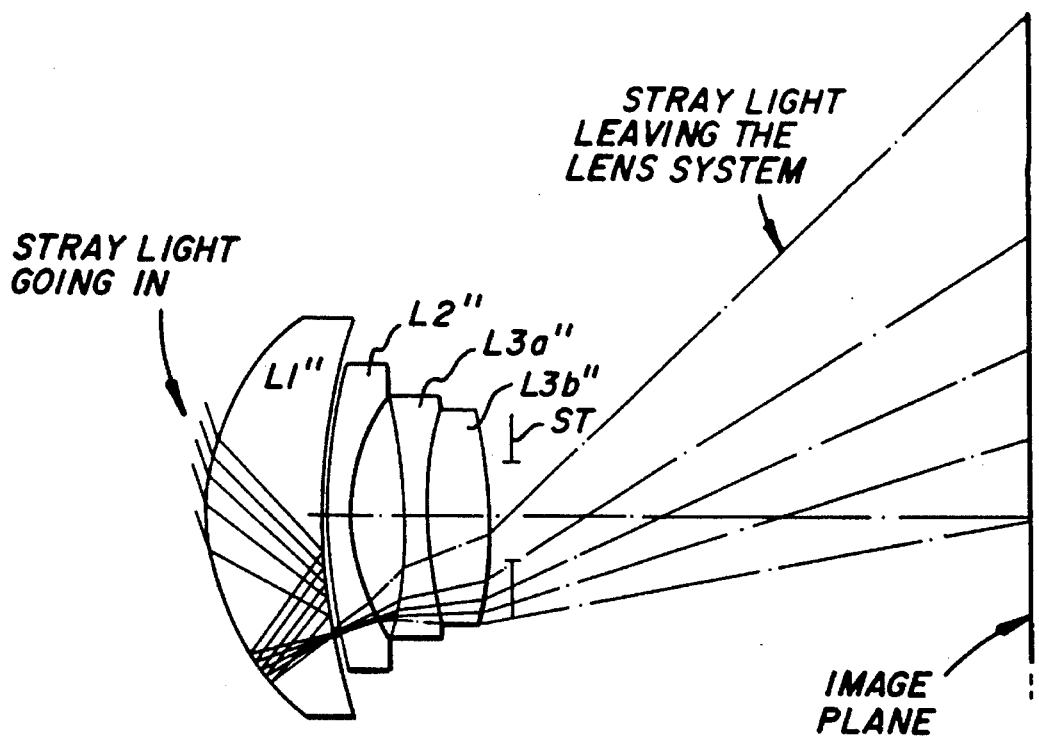
FIG. 9 illustrates how rays of stray light propagate in an optical system that does not form an embodiment of this invention.

An important consideration is the reduction of light coming from overhead and through multiple reflections eventually exposing the film. This condition is illustrated in FIG. 9. FIG. 9 shows that a double reflection condition for a light source at 72 degree azimuth angle allowing bundles of light striking high in the aperture to easily bounce twice within the front lens and then make it through a lens system to the image plane, resulting in an unacceptable picture quality.

Therefore, the first and the second lens components corresponding to lens elements L1 and L2' are configured so as to minimize the upward slope of the stray rays after the reflection from the front surface of the front lens element L1' (i.e. the 2nd reflection within the first lens element). This change results in fewer stray light rays passing through the aperture stop opening. The diaphragm walls of the aperture stop will thus block the rest of the unwanted or stray light. The shape of the second component also permits the shape of the first lens component L1 to be configured to minimize the angle of incidence of the rays for controlling internal reflections, with the result that the high incident overhead light (ray C in FIG. 10) that enters the front surface of S1' above the optical axis does not propagate towards the opening in the diaphragm and instead will be limited by the diaphragm wall. Thus, total internal reflections that will send light rays towards the image plane is minimized.

The lens system 200 of the second preferred embodiment illustrates the result of designing for stray light minimization. The stray bundles of light D do not make it through the lens system unless they strike the front most lens surface of the lens system below the optical axis resulting in near grazing incidence thus reducing the intensity of the light that is refracted. The refracted bundle is then vignetted before it reaches the image.

Figure 10:
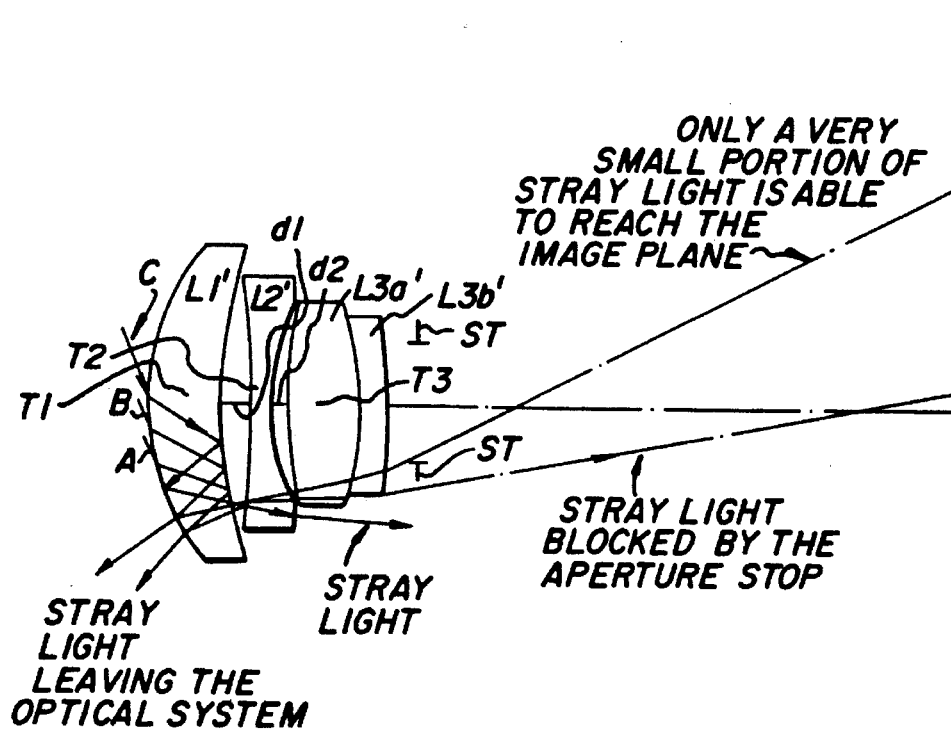
FIG. 10 illustrates a lens system of FIG. 2 and how it substantially eliminates light flare or stray light problems.

Thus, in this second embodiment, the shape of the second element L2' is configured to eliminate double and triple reflections that results in undesirable light flare at the image plane from a bright overhead object, such as the sun, when it is subtending an angle from 55 to 75 degrees. When the sun is lower in the horizon (i.e. when it subtends an angle less than 55 degrees) it would be seen in the viewfinder and the camera sensor would be eliminated as a potential camera shot. If the sun is higher than 75 degrees, then them is no chance of double reflection due to high grazing angles of the light. FIG. 9 shows the stray ray bundles and illustrates this effect. FIG. 10 shows how this effect has been controlled.

Finally, the lens systems described herein are particularly advantageous when used in the focal length range 24 mm to 27 mm and for covering half fields of at least 34 degrees.

The invention has been described in detail with particular reference to preferred embodiments thereof, but it will be understood that variations and modifications can be effected within the spirit and scope of the invention.

I claim:

1. A lens system comprising from an object side:
   a first positive power meniscus lens component having a foremost lens surface convex to the object side;
   a second bi-concave lens component engaging said first lens component and defining with said first lens component an airspace separating said second lens component from said first component;
   a third bi-convex lens component engaging said second lens component and defining with said second lens component an airspace between said third lens component from said second lens component; and
   a diaphragm arranged behind the rear-most lens element of the lens system, wherein all of the airspaces between said lens components are so arranged that there exists between all of adjacent lens components an edge contact located only at points located within the region from over 0.0 mm at a position to sufficiently eliminate stray light to about 2 mm beyond clear aperture diameter, and wherein the lens system fulfills the following conditions:

$$N_3 - N_1 \leq 0.1$$

$$\frac{N_1}{N_2} \geq 0.9$$

$$0.25f < \Sigma d < 0.35f$$

where:
   f is the composite focal length of the lens system;
   $\Sigma d$ is the distance from the vertex of the foremost lens surface to the vertex of the last lens surface;
   $N_1$ represents the refractive index of a positive lens element forming the first lens component;
   $N_2$ represents the refractive index of a negative lens element forming the second lens component; and
   $N_3$ represents the refractive index of a positive lens element forming the third lens component.

2. A lens system as claimed in claim 1, wherein:

$$T_1 \geq 2d_1$$

and $$T_3 \geq 3d_2.$$

where:
   $d_1$ is an airspace between the first and the second lens component;
   $d_2$ is an airspace between the second and the third lens component;
   $T_1$ is the thickness of said first positive lens element forming the first lens component; and
   $T_3$ is the thickness of said positive lens element forming the third lens component.

3. A lens system according to claim 1 wherein:

$$0.275 \leq \frac{|f_2|}{f} < 0.375 \quad 1.5 \leq \frac{f_1}{f_3}$$

where:
 $f_1$ represents the focal length of the first lens component;
 $f_2$ represents the focal length of the second lens component; and
 $f_3$ represents the focal length of the third lens component.

4. A lens according to claim 1, wherein:

$$0.3 \leq \frac{|f_2|}{f} \leq 0.36$$

and $$1.6 \leq \frac{f_1}{|f_2|} \leq 2.0.$$

5. A photographic device according to claim 1, wherein said first lens component is a singlet lens element, said second lens component is a single lens element; and said third lens component is a cemented doublet.

6. A photographic device according to claim 5, wherein said cemented doublet comprises a front biconvex positive lens element and a rear meniscus negative lens element.

7. A lens system comprising a plurality lens of components arranged in order from an object side:
 a first positive power meniscus lens component having an object type surface convex to the object side;
 a second bi-concave lens component engaging said first lens component and having an airspace separating said second lens component from said first component;
 a third bi-convex lens component engaging said second lens component and having an airspace separating said third lens component from said second lens component, said plurality of lens components having radii of curvature, thicknesses and airspaces to enable the lens to cover at least 55 degree field of view, wherein all of the airspaces between said lens components are so arranged that there exists between all of adjacent lens components an edge contact located only at points located within the region from over 0.0 mm at a position to sufficiently eliminate stray light to about 2 mm beyond clear aperture diameter; and
 a diaphragm arranged behind a rear-most lens element of a lens system, and wherein said lens system fulfills the following conditions:

$T_1 \geq 2d_1$ and $T_3 \geq 2d_2.$ where:
 $d_1$ is an airspace between a first and a second lens element;
 $d_2$ is an airspace between the second and a third lens element;
 $T_1$ is the thickness of the first lens element; and
 $T_3$ is the thickness of the third lens element.

8. A lens system according to claim 7, wherein all of the lens elements are glass lens elements.

9. A lens system according to claim 7, wherein:

$$0.275 \leq \frac{|f_2|}{f} < 0.375 \quad 1.5 \leq \frac{f_1}{f_3}$$

where:
 $f_2$ represents the focal length of the second lens component;
 $f_1$ represents the focal length of the first lens component; and
 f is the focal length of the lens system.

10. A photographic device according to claim 7, wherein two of said lens components each consist of a single lens element; and one of said lens components is a cemented doublet.

11. A lens system comprising in order from an object side:
 a first positive power lens component;
 a negative power lens component located between and airspaced from said first positive power lens component and a second positive power lens component;
 the second positive power lens component located behind said negative power lens component;
 an aperture stop, said aperture stop located on an outer side of one of said positive power lens components; and
 wherein all of airspaces between said lens components are so arranged that there exists an edge contact between all of the adjacent lens components so that there are contacting lens surfaces and said edge contact exists only at points located within the region from 0.0 mm at a position to sufficiently eliminate stray light to less than 3 mm beyond a clear aperture diameter of each of said contacting lens surfaces.

12. A lens system according to claim 11, wherein said edge contact is at less than 2 mm beyond said clear aperture.

13. A lens system according to claims 12, wherein:

$$0.275 \leq \frac{|f_2|}{f} \leq 0.375,$$

where $f_2$ represents the focal length of the negative power lens component and f is the focal length of the lens system.

14. A lens according to claim 12, wherein:

$$0.3 \leq \frac{|f_2|}{f} \leq 0.36,$$

where $f_2$ represents the focal length of the negative power lens component and f is the focal length of the lens system.

15. A compact lens system according to claim 11, wherein said aperture stop being arranged behind a rearmost lens element from an object side.

16. A compact lens system according to claim 11 having the following parameters:

$22 \leq f \leq 28$ $5 \leq BF \leq 23$ $2 \leq f/No.|_{min.} \leq 5.6,$ where f is the focal length of the lens system, BF is the back focus of the lens system and $f/No.|_{min.}$ is the F-number that the lens system performs at without being stepped down.

17. A compact lens system according to claim 11, wherein the rear lens of positive power component is a cemented doublet.

18. A compact lens system according to claim 16, wherein there is an edge contact between all of the lens components at more than 0.0 mm so as to sufficiently eliminate stray light to less than 3 mm beyond clear aperture, and $$0.275 \leq \frac{|f_2|}{f} \leq 0.375,$$

where $f_2$ represents the focal length of the negative power lens component and f is the focal length of the lens system.

19. A photographic device according to claim 11, wherein two of said lens components each consist of a single lens element; and one of said lens components is a cemented doublet.

20. A compact lens system for use in a compact photographic camera comprising:

a plurality of lens elements forming lens components and spaced in a close proximity to one another, said plurality of lens elements having sufficient powers and spacings to enable said lens system to cover a field of view of at least 55 degrees, said plurality of lens elements including at least one positive power lens element and one negative power lens element wherein an airspace between said positive power lens element and said negative power lens element is smaller than a thickness of said positive lens element, wherein all of airspaces between the lens components are so arranged that there exists between all adjacent lens components an edge contact located only at points located within the region from over 0.0 mm at a position to sufficiently eliminate stray light to about 2 mm beyond clear aperture diameter; and the lens system being suited for use in a compact camera and satisfying the following parameters:

20≦f≦30

5≦BF≦24.85

2≦f/No.|$_{min.}$≦5.6, where f is the focal length of the lens system, BF is the back focus of the lens system and f/No.|$_{min.}$ is the F-number that the lens system performs at without being stopped down.

21. A compact lens system according to claim 20, wherein said plurality of lens elements are only three lens components arranged in order from an object side, a first positive power lens component that includes said one positive power lens element, a second negative power lens component that includes said negative power lens element, and a third positive power lens component.

22. A compact lens system according to claim 20 further comprising an aperture stop arranged behind a rearmost lens element from an object side.

23. A compact lens system according to claim 21 further comprising an aperture stop arranged behind a rearmost lens element from the object side.

24. A photographic device according to claim 20, wherein said first lens component is a singlet lens element, said second lens component is a single lens element; and said third lens component is a cemented doublet.

25. A compact lens system for use as a taking lens in a compact camera, the lens system comprising no more than four lens elements centered on an optical axis and grouped together in a 3 lens component lens group with an aperture stop arranged outside of the lens group; said lens elements arranged so that there is edge contact among all of the adjacent and uncemented lens elements and the lens elements have cooperating edge surfaces to self-center said lens elements, wherein all of airspaces between said adjacent and uncemented lens elements are so arranged that said edge contact exits only at points located within a region from over 0.0 mm at a position to eliminate stray light to about 2 mm beyond clear aperture diameter, said lens components being a front positive power lens component, a negative power lens component and a rear positive power lens component wherein said rear positive power lens component is a cemented doublet comprising one positive lens element and one negative lens element.

26. A compact lens system according to claim 25 further having the following parameters:

| f' = 25.56; BF = 20.31; semifield angle = 33.58°; f/No. = 3.5. | | | | | | |
|---|---|---|---|---|---|---|
| Lens | | Clear | | | Material | |
| Element | Surface | Aper. | Radius | Thickness | $N_d$ | V |
| L1' | S1' | 10.53 | $R_1$ = 8.02940 | $T_1$ = 2.500 | 1.734 | 51.8 |
|  | S2' | 8.80 | $R_2$ = 15.8029 | $d_1$ = 1.102 |  |  |
| L2' | S3' | 8.23 | $R_3$ = −31.7598 | $T_2$ = 0.668 | 1.689 | 31.2 |
|  | S4' | 6.76 | $R_4$ = 8.18380 | $d_2$ = 0.577 |  |  |
| L3a' | S5' | 6.60 | $R_5$ = 15.8680 | $T_3$ = 2.565 | 1.788 | 47.5 |
| L3b' | S6' | 6.11 | $R_6$ = −9.92860 | $T_4$ = 0.850 | 1.569 | 56.1 |
|  | S7' | 5.91 | $R_7$ = −31.4600 | $d_3$ = 1.000 |  |  |
|  |  | 6.14[(1)] | DIAPHRAGM[(1)] |  |  |  |

[(1)]THE DIAPHRAM ACTS AS A BAFFLE WHEN THE LENS OPERATES AT f/3.5 AND APERTURE HOLD ON SURFACE S7' BECOMES THE STOP.

where f' is the composite focal length of the lens system: BF is the back focal length of the lens system: F/No. is the F-number of the lens system: Li' is the lens element number i: and Si' is the lens surface number i.

27. A compact lens system according to claim 25 further having the following parameters:

| | | | $f = 25.57$; BF = 20.68; semifield angle = 33.58°. Maximum aperture with no vignetting corresponds to $f/4.5$. | | | |
|---|---|---|---|---|---|---|
| Lens Element | Surface | Clear Aper. | Radius | Thickness | Material $N_d$ | V |
| L1 | S1 | 9.90 | $R_1 = 7.4251$ | $T_1 = 2.852$ | 1.713 | 53.8 |
|    | S2 | 7.90 | $R_2 = 13.046$ | $d_1 = 0.974$ | | |
| L2 | S3 | 7.90 | $R_3 = -21.793$ | $T_2 = 0.520$ | 1.699 | 30.1 |
|    | S4 | 6.86 | $R_4 = 8.0817$ | $d_2 = 0.533$ | | |
| L3 | S5 | 6.79 | $R_5 = 15.453$ | $T_3 = 1.862$ | 1.786 | 44.2 |
|    | S6 | 6.28 | $R_6 = -15.453$ | $d_3 = 1.000$ | | |
|    |    | 4.40 | DIAPHRAGM | | | |

Where f' is the composite focal length of the lens system: BF is the back focal length of the lens system: F/No. is the F-number of the lens system: Li' is the lens element number i: and Si' is the lens surface number i.

28. A compact lens system for use in a compact camera comprising:

a plurality of optical elements spaced in close proximity to one another, said plurality of lens elements having sufficient powers and spacings to enable said lens system to cover a field of view of at least 55 degrees, said plurality of lens elements including at least one positive lens element and one negative lens element wherein an airspace between said positive lens element and said negative lens element is smaller than a thickness of said positive lens element, wherein all of airspaces between all of adjacent lens elements are so arranged that there exists an edge contact located only at points located within the region from over 0.0 mm at a position to sufficiently eliminate stray light to about 2 mm beyond clear aperture diameter; and the lens system being suited for use in a compact camera and satisfying the following parameters:

$2 \leq f/No.|_{min.} \leq 5.6$ $20 \leq f \leq 30$, where:

f is the focal length of the lens system; and $f/No.|_{min.}$ is the F-number that the lens system performs at without being stopped down.

29. A compact lens system for use in a compact photographic camera comprising:

a plurality of lens elements forming a plurality of lens components and spaced in a close proximity to one another, said plurality of lens elements having sufficient powers and spacings to enable said lens system to cover a field of view of at least 50 degrees, said plurality of lens elements including at least one positive power lens element and one negative power lens element wherein an airspace between said positive power lens element and said negative power lens element is smaller than a thickness of said positive lens element, wherein all of airspaces between the lens components are so arranged that there exists between all adjacent lens components an edge contact located only at points located within the region from over 0.0 mm at a position to sufficiently eliminate stray light to about 2 mm beyond clear aperture diameter; and the lens system being suited for use in a compact camera and satisfying the following parameters:

$20 \leq f \leq 30$ $5 \leq BF \leq 24.25$ $3 \leq f/No.|_{min.} \leq 16$, where f is the focal length of the lens system, BF is the back focus of the lens system, all distances are in mm, and the f/No. is the f number of the lens system.

30. A compact lens system according to claim 29, wherein said plurality of lens elements are only three lens components arranged in order from an object side, a first positive power lens component that includes said one positive power lens element, a second negative power lens component that includes said negative power lens element, and a third positive power lens component.

31. A compact lens system according to claim 29 further comprising an aperture stop arranged behind a rearmost lens element from an object side.

32. A compact lens system according to claim 30 further comprising an aperture stop arranged behind a rearmost lens element from the object side.

33. A lens system according to claim 29, wherein all of airspaces between said lens components are so arranged that there exists an edge contact between all of the lens components at less than 2 mm beyond a clear aperture of any contacting surface.

34. A lens system according to claim 30, wherein all of airspaces between said lens components are so arranged that there exists an edge contact between all of the lens components at less than 2 mm beyond a clear aperture of any contacting surface.

* * * * *